Sept. 19, 1944. P. H. LYNCH, JR., ET AL 2,358,583
STALK CUTTER
Filed Aug. 3, 1943 2 Sheets-Sheet 2
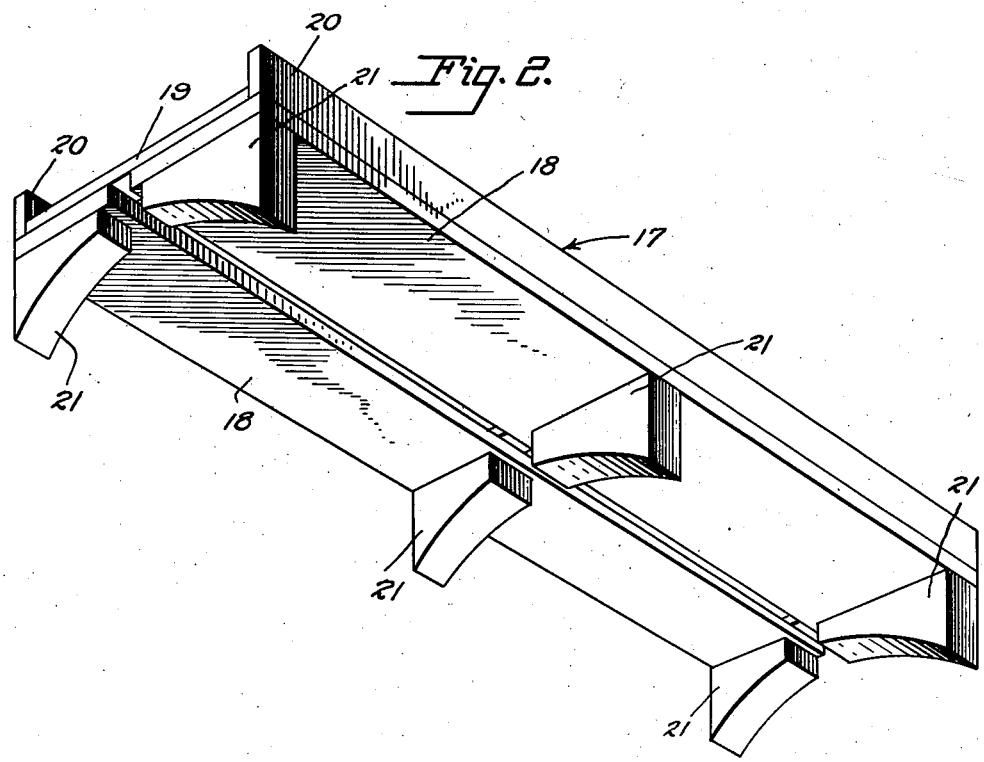
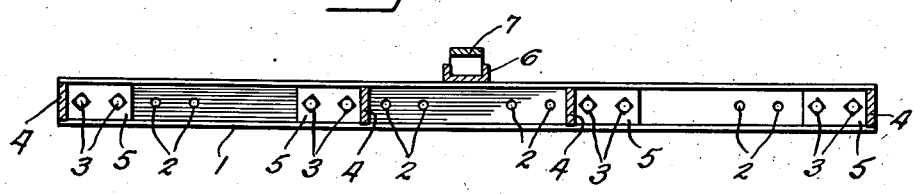
Inventors
P. H. Lynch, Jr.
G. P. McKay
By Mason Fenwick & Lawrence
Attorneys Patented Sept. 19, 1944

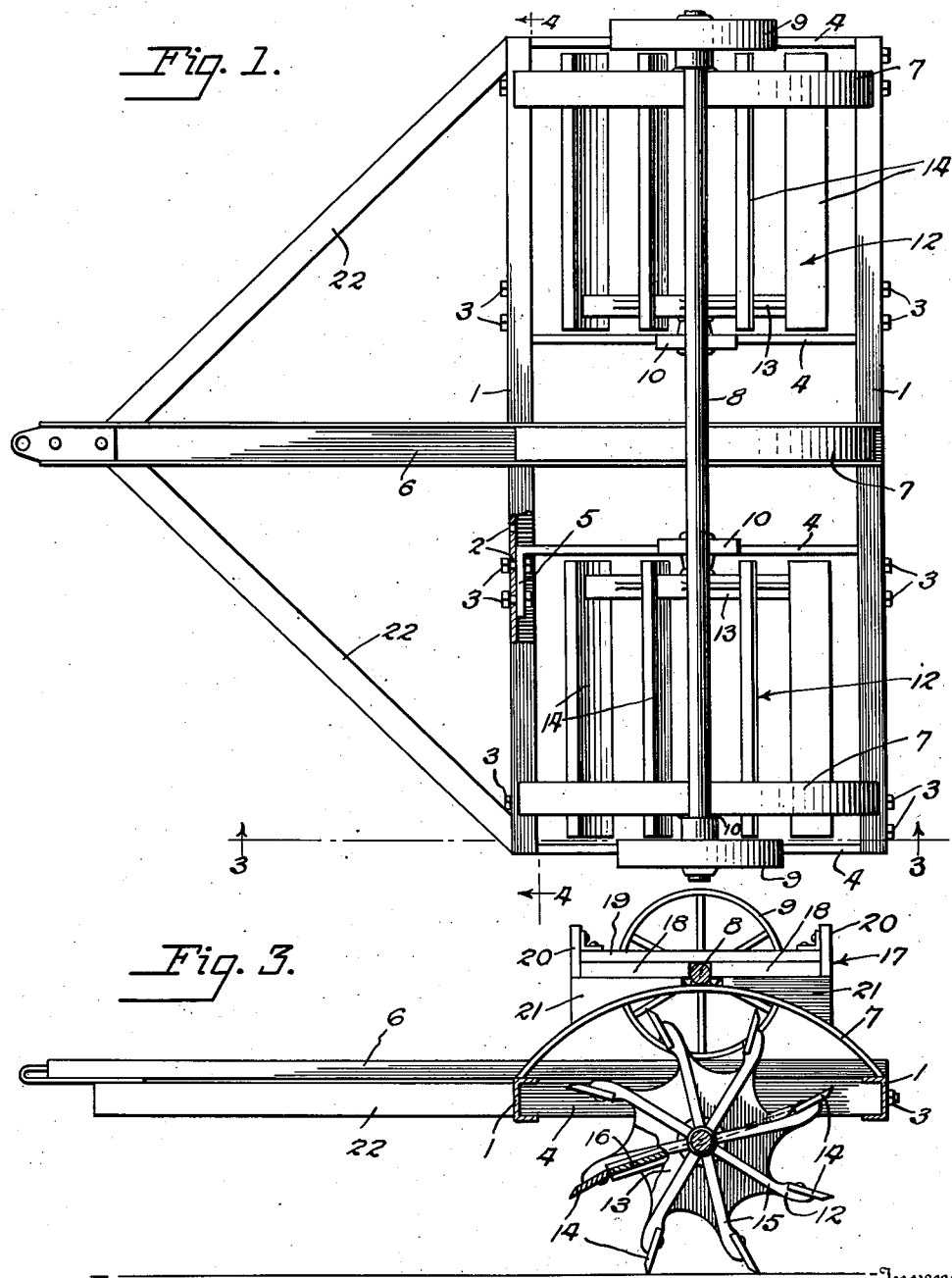

2,358,583

UNITED STATES PATENT OFFICE 2,358,583

STALK CUTTER

Patrick H. Lynch, Jr., and George P. McKay, Dunn, N. C., assignors to The John A. McKay Mfg. Company, Dunn, N. C.

Application August 3, 1943, Serial No. 497,236

6 Claims. (Cl. 55—61)

This invention relates to stalk cutters, and more particularly to devices of this character intended to cut heavy stalks such as those of cotton plants in the field, with rapidity and a high degree of efficiency.

The object of the present invention is to provide an improved stalk cutter adapted to cut two rows of stalks simultaneously, with means for adjusting the cutters to adapt same to variations in the width of the rows.

A further object of the invention is to provide a device of this character of improved and simplified construction, reducing the amount of material to a minimum, while at the same time affording maximum strength and rigidity.

Further objects will more clearly appear in the course of the following detailed description.

The invention consists in the novel construction, arrangement and combination of parts hereinafter more particularly described and claimed.

Two sheets of drawings accompany this specification as part thereof, in which like reference characters indicate like parts throughout.

Figure 1 is a plan view of the improved stalk cutter.

Figure 2 is a bottom perspective view of the weight tray.

Figure 3 is a transverse cross-section taken on line 3—3 of Figure 1.

Figure 4 is a transverse section taken on the line 4—4 of Figure 1.

The frame of the improved stalk cutter comprises longitudinal spaced members 1—1 of channel cross-section having their channels facing inwardly, and each of these channels is provided in the web portions with a plurality of spaced holes 2 through which bolts 3 can be selectively passed to secure in adjusted positions transverse bridge members 4, the ends of which are bent at right angles as at 5, and adapted to seat within the channels of the longitudinal members 1.

The longitudinal members 1 are secured in their spaced parallel relationship by means of a tongue 6, also formed of channel cross-section and secured transversely of the longitudinal members and centrally thereof, as illustrated. The longitudinal members are further connected by arch members 7 secured by their ends to the longitudinal members, or in the case of the central arch member, to the tongue immediately above the longitudinal members by welding or other suitable connection. An axle 8 extends lengthwise of the frame, resting upon and being secured by welding or otherwise medially of and upon the arch members and traction wheels 9 are rotatably mounted on the opposite free ends of this axle. Journals 10 are mounted as by bolts 11 on each of the bridge members 4 to rotatably support the cutters 12, each of which comprise spaced spiders 13 connected by cutter blades 14 which may be secured by bolts or otherwise to the ends of the spider arm 15. Preferably, a central shelf 16 of thin boards connects the spiders and operates to throw the cut stalk fragments clear of the cutters.

A weight tray 17 is provided, comprising spaced bottom boards secured as by transverse cleats 19 with side walls 20, and the central slot provided by spacing the bottom boards is of a width and depth adapted to receive the axle 8 and thus rigidly align the weight tray in position. Curved wedge blocks 21 are secured on the bottom face of the bottom boards 18, these wedge blocks being shaped to conform with the curvature of the arch members 7.

The tongue 6 may be braced, if desired, as by diagonal braces 22, and provided with a connection at its forward end for engagement with a tractor.

From the above description it will be apparent that the rotary cutters can be readily adjusted lengthwise of the longitudinal frame members, and that the whole device combines extreme rigidity with relative lightness and a minimum use of steel. It can be readily conveyed to the field where the work is to be done on the traction wheels 9 and there inverted for use.

Various modifications will readily suggest themselves to those skilled in the art, but within the scope of the present invention as claimed.

Having thus fully described our invention, we claim:

1. A stalk cutter comprising a substantially rectangular frame including parallel spaced longitudinal members of channel cross section with their channels facing inwardly, means for holding said longitudinal members in position, a plurality of transverse bridging members, the ends of which are adapted to seat in the channels of said longitudinal members, means for adjustably securing said bridging members in selected positions and stalk cutters rotatably mounted on said bridging members.

2. A stalk cutter as specified in claim 1 in which the means for spacing the longitudinal members comprise a plurality of spaced arch brace members fixedly secured by their opposite ends to similar faces of the longitudinal members, an axle member extending lengthwise of the frame centrally of the arch members and rigidly secured on the outer face of each of said arch members and traction wheels rotatably mounted on the outer ends of said axle.

3. In a stalk cutter having longitudinal members and transverse spaced arch brace members secured by their opposite ends to similar faces of the longitudinal members, an axle member extending centrally of the arch members and rigidly secured on the outer face of each of said arch members, and traction wheels rotatably mounted on the outer ends of said axle, a weight box including bottom and side members, the bottom formed of parallel spaced members adapted to seat on the arch members on each side of the axle, with wedge blocks on the under face of said bottom members shaped to conform with and engage the arch members.

4. A stalk cutter comprising a rectangular frame including parallel spaced longitudinal members of channel cross section with their channels facing inwardly, a tongue of channel cross section extending transversely and medially of said longitudinal members and rigidly secured thereto, transverse arch members arranged in parallel spaced relation and secured by their ends to said longitudinal members, an axle secured medially to each of the arch members, traction wheels rotatably mounted on the ends of the axle, transverse bridge members adjustably supported by their ends in the channels of the longitudinal members, rotary cutters, journals for the cutters carried by the bridge members and a weight box including side and bottom members, the bottom formed with a slot adapted to receive the axle and having wedge blocks conforming in shape with the arch members.

5. A stalk cutter comprising a rectangular frame including parallel spaced longitudinal members and transverse bridge members, transverse arch members secured by their ends to the longitudinal members, an axle secured medially to each arch member, traction wheels on the axle, rotary cutters journalled on the bridge members and a weight box including side and bottom members, the bottom formed with a slot adapted to receive the axle and having wedge blocks conforming in shape with the arch members.

6. A weight box for stalk cutters, comprising bottom and side members, the bottom consisting of spaced parallel members adapted to engage an axle between their adjacent edges, with arcuate shaped wedge members positioned on the bottom members in transverse alignment and in pairs spaced longitudinally of the bottom.

PATRICK H. LYNCH, Jr.
GEORGE P. McKAY.